(12) United States Patent
Steele et al.

(10) Patent No.: US 8,038,829 B2
(45) Date of Patent: Oct. 18, 2011

(54) COATING METHOD FOR PIPE HAVING WELD BEAD

(75) Inventors: Robert E. Steele, Meaford (CA); Dennis T. H. Wong, Toronto (CA); Peter Singh, Calgary (CA); Chunglee Hank Yih, Calgary (CA)

(73) Assignee: ShawCor Ltd., Toronto (CA)

( * ) Notice: Subject to any disclaimer, the term of this patent is extended or adjusted under 35 U.S.C. 154(b) by 339 days.

(21) Appl. No.: 12/278,317

(22) PCT Filed: Feb. 22, 2007

(86) PCT No.: PCT/CA2007/000271
§ 371 (c)(1),
(2), (4) Date: Nov. 13, 2008

(87) PCT Pub. No.: WO2007/095741
PCT Pub. Date: Aug. 30, 2007

(65) Prior Publication Data
US 2009/0165944 A1    Jul. 2, 2009

(30) Foreign Application Priority Data
Feb. 22, 2006  (CA) .................... 2537348

(51) Int. Cl.
| | |
|---|---|
| B29C 65/00 | (2006.01) |
| B29C 47/00 | (2006.01) |
| B29C 65/10 | (2006.01) |
| B32B 17/10 | (2006.01) |
| B32B 37/00 | (2006.01) |
| B32B 38/00 | (2006.01) |
| B24D 11/00 | (2006.01) |
| B05D 1/12 | (2006.01) |
| B05D 1/36 | (2006.01) |
| B05D 7/00 | (2006.01) |
| B05D 3/02 | (2006.01) |
| B05D 1/02 | (2006.01) |
| B05D 3/00 | (2006.01) |
| B05D 3/12 | (2006.01) |
| B05D 1/34 | (2006.01) |
| C09J 5/02 | (2006.01) |

(52) U.S. Cl. .................. 156/283; 156/279; 156/244.27; 156/244.12; 156/244.13; 156/324.4; 156/498; 427/180; 427/410; 427/318; 427/424; 427/425; 427/195; 427/292; 427/426

(58) Field of Classification Search .................. 156/283, 156/279, 244.27, 244.12, 244.13, 324.4, 156/498; 427/180, 410, 318, 29, 424, 425, 427/195, 292, 426
See application file for complete search history.

(56) References Cited

U.S. PATENT DOCUMENTS
3,560,295 A * 2/1971 Kimbrell .................... 156/287
(Continued)

FOREIGN PATENT DOCUMENTS
CA    1174958    9/1984
(Continued)

*Primary Examiner* — Khanh P Nguyen
*Assistant Examiner* — Matthew Hoover
(74) *Attorney, Agent, or Firm* — DeLio & Peterson, LLC; Peter W. Peterson

(57) ABSTRACT

Method of coating pipe having a raised weld bead. Curable resin polymer is applied to the pipe and allowed to bond to form a cured or partially cured polymer layer on the pipe. Powder form adhesive composition is applied on the polymer layer while hot, with fusion into a film bonding to the polymer. Powder form polyolefin is applied to the adhesive while hot with fusion into a film bonding to the adhesive to form a powder-based coating. Following forming of the powder-based coating, the pipe is cooled from the inside. An outer polyolefin covering is bonded to the powder-based coating and the pipe cooled to ambient temperature. This procedure can avoid voids, cavities or pinholes forming in the coating adjacent the weld bead.

20 Claims, 11 Drawing Sheets

U.S. PATENT DOCUMENTS

| | | |
|---|---|---|
| 3,941,087 A | 3/1976 | Yazaki |
| 4,287,223 A | 9/1981 | Hackert et al. |
| 4,481,239 A | 11/1984 | Eckner |
| 4,510,007 A | 4/1985 | Stucke |
| 4,661,379 A | 4/1987 | Frei et al. |
| 4,685,985 A | 8/1987 | Stueke |
| 4,771,523 A | 9/1988 | Qureshi et al. |
| 4,786,339 A | 11/1988 | Meyer et al. |
| 5,026,451 A * | 6/1991 | Trzecieski et al. ....... 156/244.27 |
| 5,061,510 A | 10/1991 | Nussbaumer et al. |
| 5,178,902 A * | 1/1993 | Wong et al. ................... 427/470 |
| 5,567,480 A | 10/1996 | Johnson et al. |
| 6,063,452 A | 5/2000 | Mild et al. |
| 6,165,302 A | 12/2000 | Marzola et al. |
| 6,174,569 B1 | 1/2001 | Blomer et al. |
| 6,220,305 B1 | 4/2001 | Johnson et al. |
| 6,276,400 B1 | 8/2001 | Jackson et al. |
| 7,243,697 B2 | 7/2007 | Daykin et al. |
| 2005/0061436 A1 | 3/2005 | Duns |
| 2005/0061655 A1 | 3/2005 | Gros et al. |
| 2006/0127622 A1 | 6/2006 | Mohan et al. |

FOREIGN PATENT DOCUMENTS

| | | |
|---|---|---|
| DE | 2425851 | 12/1975 |
| DE | 2448292 | 4/1976 |
| DE | 3101684 | 8/1982 |
| DE | 3230955 | 2/1984 |
| DE | 3335502 | 3/1985 |
| DE | 19643434 | 5/1997 |
| DE | 19618256 | 12/1997 |
| DE | 102004055559 | 2/2006 |
| EP | 183930 | 6/1986 |
| EP | 468979 | 11/1990 |
| EP | 429147 | 5/1991 |
| EP | 438900 | 7/1991 |
| EP | 1045750 | 5/1999 |
| GB | 2276103 | 9/1994 |
| WO | WO9203234 | 3/1992 |
| WO | WO9519853 | 7/1995 |
| WO | WO9807896 | 2/1998 |
| WO | WO0073693 | 12/2000 |
| WO | WO2006065043 | 6/2006 |
| WO | WO2006090016 | 8/2006 |

* cited by examiner

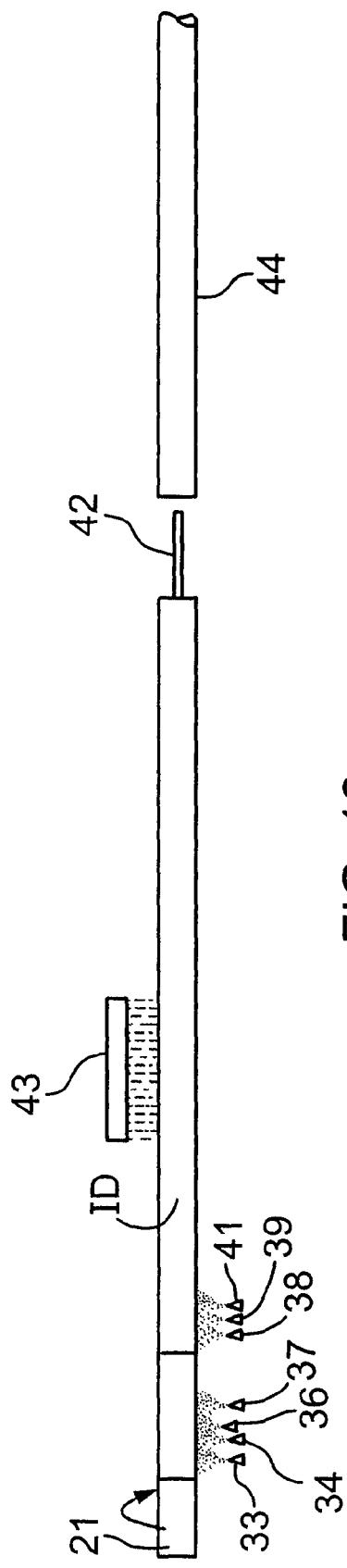
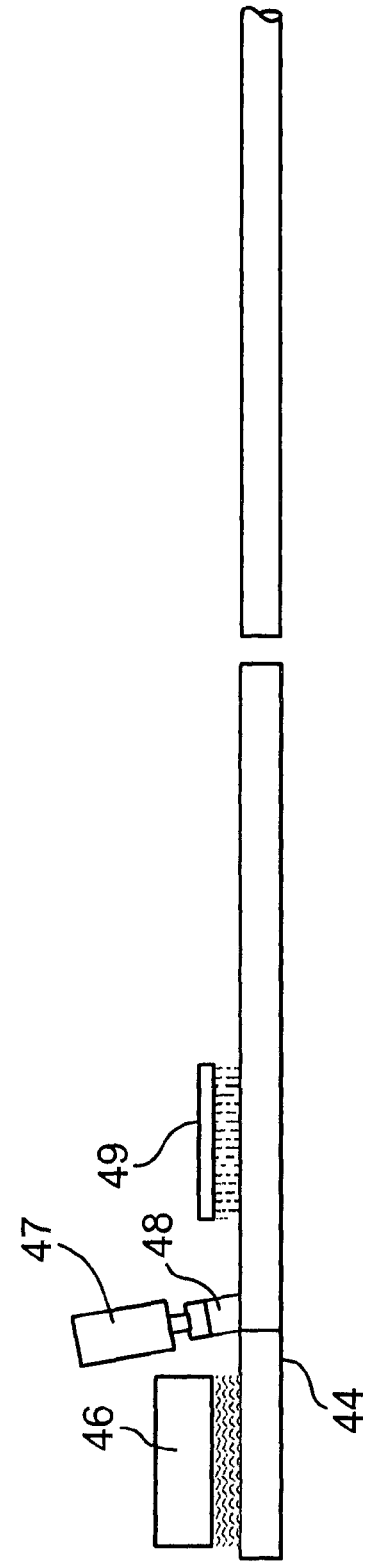

COATING METHOD FOR PIPE HAVING WELD BEAD

The present invention relates to a method of coating metal pipe and, more particularly, to coating pipe having a weld bead on its outer circumference.

Protective coatings are extensively used to protect metal pipe, for example steel pipe, from corrosion and mechanical damage. A widely used commercially available coating is that described in U.S. Pat. No. 5,026,451 (Trzecieski et al) assigned to the present applicant, wherein an epoxy resin is applied on the pipe and an outer polyolefin covering is bonded to the epoxy layer through an intermediate copolymer adhesive layer. In a preferred embodiment, the Trzecieski et al patent described applying the outer polyolefin covering by a cross head extrusion process.

In the cross head extrusion process, the polyolefin is extruded through an annular die, through the centre of which the pipe is fed axially. Because there are practical limitations on the diameters of cross head extrusion dies, it is preferred in the case of pipe of large diameter to provide the outer covering by a side wrap process wherein a continuous sheet of polyolefin is wrapped helically about the exterior circumference of the pipe.

Steel pipes are provided in two basic configurations. Seamless pipe is formed continuously from molten steel into a tube, and therefore there is no seam or weld. Such pipes can be coated without any concern about covering a raised weld. However, seamless pipes cannot be made in very large diameters, and are expensive. Thus their use is confined to applications involving very high pressures or stresses, such as catenary risers or subsea flow lines, or applications exposed to large, continuous mechanical stresses, such as drill pipe and casing. Most pipes used to transport oil, gas and water are welded pipes. These are produced from steel plate which is bent and formed into a tube, then welded along the edges to form a pipe. With small diameter pipes, it is common to use electric resistance welding (ERW), which results in a weld seam which is flush with the body of the pipe. However, this method is restricted to relatively small diameter pipe, currently being 24" or less in diameter. Pipes larger than that are formed in such a way that the weld seams protrude above the outer surface of the remainder of the pipe.

There are two basic procedures for manufacturing large diameter pipe. The first, and most common, is to form steel plate into a "U" shape, then further into an "O" shape. The edges are then welded together to create a so-called "long-seam" pipe. The second method, which is gaining in popularity, is to continuously form and weld steel plate in a spiral fashion to create so-called "spiral-weld", or "spiral" pipe. In both cases welds project both above and into the pipe diameter.

In the case of the present invention, the weld on the external surface of the pipe is the relevant one. The terminology used to describe the shape of a weld may be explained with reference to FIG. 1 and will be used hereinafter. 11 indicates the toe of the weld, 12 the crown and 13 an undercut. 14 indicates the height of the weld. The shape and height of the weld varies between the two methods (spiral and longseam), as well as from manufacturer to manufacturer. The ideal shape is one which makes a smooth transition from the body of the pipe, and which is not too high, as illustrated in FIG. 2. However, this configuration is rarely achieved unless the weld seam is ground to shape. It is more common for the welds to assume the shapes shown in FIGS. 2 through 5 which illustrate a weld with square edges (FIG. 3), square edges with a slight undercut (FIG. 4), square edges with a severe undercut (FIG. 5) and a weld with severe undercuts both sides and a recess on top (FIG. 6).

When the side-wrap coating procedure is used with pipe that has high raised weld beads or substantially square section weld beads on its outer circumference, it is often found that contact between the continuous sheet and parts of the weld bead, for example the concave toe and undercut portions 11 and 13, may be poor or non-existent, resulting in voids at the toe of the weld. This is particularly accentuated if the weld profile is substantially square or undercut in the vicinity of the toe. With spirally-welded pipe it is typically still more difficult to obtain uniform coverage over the weld than it is with a "long seam" pipe having a single axially extending weld. There is a particular problem with "double-jointed" spiral-welded pipe, in which two lengths of pipe are welded together to form a longer pipe, because such pipes always contain at least one point at which two welds meet at a 90 degree angle to one another.

Usually, the side wrapped sheet is provided from an extruder alongside the pipe coating line. It is also possible to use a continuous sheet that is heated adjacent the pipe coating line to a temperature that will allow adhesion between the pipe and the sheet. In known methods, water quenching is applied onto the outer polymer surface typically within one metre of the extrusion die or side wrapping station in order to solidify the polyolefin sufficiently to prevent damage during further handling, for example contact with conveying tires. As the outer surface begins to cool, the polyolefin layer develops hoop stress around the pipe. At the raised weld, this hoop stress attempts to pull the molten polymer into a tangential configuration, and this causes the thickness to decrease at the top of the weld. Voids, separation of layers, or discontinuities may develop in the coating adjacent the concavely recessed neck portion, or pin holes or cavities may occur within the thickness of the coating material, with the result that the protective properties of the coating may be regarded as deficient or inadequate.

In the present invention, there is provided an improved method of providing a coating on a pipe that has a weld bead on its outer circumference, with the weld bead projecting from the outer circumference of the pipe. In the present method, a curable resin polymer is applied to the pipe and the curable resin is permitted to bond to the pipe to form an cured or partially cured polymer layer on the pipe. Preferably, immediately thereafter, and while the pipe is still hot, a powder form adhesive composition is applied to the pipe having the cured or partially cured polymer layer on it, under conditions allowing bonding of the adhesive composition to the curable polymer layer. Preferably, immediately thereafter, and while the pipe is still hot, a powder form polyolefin is applied to the pipe, under conditions allowing bonding of said polyolefin to the adhesive composition. The polyolefin powder is allowed to bond to the adhesive composition layer and to fuse to form a polyolefin layer on the pipe. The coating at this point will hereinafter be referred to as "powder-based polyolefin coating".

At a stage following formation of the powder-based polyolefin coating, an outer polyolefin covering is applied on the pipe by side extrusion. The outer polyolefin covering is bondable to the powder-based polyolefin coating, and is applied at a stage at which the pipe is sufficiently hot to permit bonding of the polyolefin covering. The pipe having the outer polyolefin covering is then cooled to ambient temperature. Alternatively, the side-extruded polyolefin layer may be applied directly in line with the application of the powder-based polyolefin coating. In such case there is no need to add additional heat to the pipe between the application of the powder-based polyolefin coating and the application of the outer layer of side-extruded polyolefin.

In all cases, the cooling of the pipe is done either entirely from the inside of the pipe, or by a combination in which the initial cooling is done from the inside of the pipe, and the external cooling follows only after the coating immediately adjacent to the pipe has been substantially cooled.

Internal cooling is used to ensure that a coating immediately adjacent the pipe has been substantially cooled or solidified, for example the adhesive composition and at least part of the polyolefin powder-based coating have solidified, before the exterior of the coated pipe is exposed to rapid cooling. When a polyolefin goes from a melt state to a solid state, it typically undergoes a shrinkage of 10 to 20%. If the coating is cooled from the outside surface inwards, the solidified outer layer will exert a large stress tangential to the raised weld, which translates into a force normal to the any concave surfaces, such as at the toe of the weld. This is accentuated by the volumetric shrinkage of the molten material adjacent to the weld as it solidifies. By first solidifying the material at the pipe surface adjacent to the weld, sufficient strength is created to enable it to resist the forces normal to the surface attempting to pull it away and create voids and/or tears.

At least preferred embodiments of the present invention overcome the above noted disadvantages of known processes. The application of a powder-based polyolefin coating layer adjacent to the toe of the weld results in a smoother transition between the weld bead and adjacent circumference of the pipe. This smooth transition, together with the effects of the interior surface cooling of the pipe serve to consolidate the coating materials on the pipe surface, resulting in a more uniform coating thickness around the pipe and over the weld. In preferred forms, the difference in coating materials thickness between the top of the weld and the body of the pipe is minimal. The coating conforms closely to the weld profile and there is no "weld tenting". This result can be achieved with both long seam and spiral welded pipes.

Interior surface cooling may, for example, be accomplished as described in Wong et al, U.S. Pat. No. 6,270,847, the disclosures of which are hereby incorporated by reference.

Various techniques may be used for providing the cured or partially cured polymer layer, and for applying the adhesive composition under conditions such that it bonds to the cured or partially cured polymer.

In one preferred form, the curable resin polymer comprises epoxy resin. Other curable resins suitable for application to pipe in a protective coating, and their methods of application and curing, are well known to those skilled in the art and need not be described in detail herein. While, for the sake of simplicity, the following will refer to epoxy resin, it will be appreciated that the techniques described are applicable to other curable resin polymers.

For example, epoxy resin may be applied in curable liquid form, using procedures as described in the above-mentioned U.S. Pat. No. 5,026,451, the disclosures of which are incorporated herein by reference. In one form, the liquid coating is partially cured, for example to an incompletely-cured gel stage, preferably by heating the pipe under heating conditions well known to those skilled in the art.

In a further example, epoxy resin may be applied in the form of a preferably incompletely cured fusion bonded epoxy (FBE), as described in U.S. Pat. No. 4,345,004 (Miyata et al), U.S. Pat. No. 4,510,007 (Stucke) and U.S. Pat. No. 5,178,902 (Wong et al) assigned to the present applicant, the disclosures of all of which are incorporated herein by reference.

In order to provide for bonding between the adhesive composition and the epoxy resin layer, the adhesive composition must contain chemical groups capable of bonding with, or preferably reacting with the epoxy composition, and must also be capable of bonding to the polyolefin layer of the powder-based composite coating. Most commonly the adhesive composition will comprise a modified polyolefin, wherein the polyolefin contains functional groups that are reactive with the functional groups present in the epoxy. Examples of such modified polyolefins are well known to those skilled in the art. Common chemical groups incorporated into polyolefins to make them bondable to epoxies include those derived from co- or graft-copolymers of vinyl acetate, ethyl acrylate, methyl acrylate, and maleic acid. The polyolefin adhesive composition may consist of blends of functionalized and non-functionalized polyolefins. Numerous examples of modified polyolefins bondable to epoxy, and that may be employed in the present method, are described in more detail in the above-mentioned Wong et al '902 Miyata et al. '004, and Stucke et al '007 patents, as well as in Sakayori et al U.S. Pat. No. Re. 30,006, the disclosure of which is incorporated herein by reference.

The copolymer adhesive is applied to the pipe in powder form while the pipe is hot. In one especially preferred form of the present invention, a copolymer adhesive is applied in accordance with the procedures described in the Wong et al '902 patent, wherein FBE and copolymer adhesive are co-sprayed onto the pipe and are allowed to fuse forming the interlayer consisting of interspersed and interlocked domain referred to above, such domains consisting respectively of epoxy and copolymer adhesive. In such case, the epoxy reinforces the adhesive, and provides it with higher melt strength, thereby reducing any tendency for separation or discontinuities to occur in the coating layer.

Adequate results can, however, be achieved by applying the copolymer adhesive as a discrete layer on the epoxy layer, provided that the copolymer adhesive has an adequate melt strength, the melt strength being indicative of the ability of the polymer to resist flow or movement at the temperatures at which the coating layers are subjected to stress during a cooling stage. Polymers having high melt strength are indicated by a low melt flow index, which indicates a higher molecular weight for the polymer. Typically the higher the molecular weight the slower the rate of fusion into a continuous layer.

Therefore, in such case the melt strength of the copolymer adhesive is desirably not excessively high, since this may give rise to problems of application since, at the temperature of application, the high melt strength copolymer adhesive may not flow adequately at the application temperature to provide the required coating conforming closely and continuously to the epoxy-coated pipe.

In the practice of the present invention, one of ordinary skill in the art can readily determine by trial and error the copolymer adhesive melt strength properties necessary to achieve a coating free from separation of layers, discontinuities, pin holes, cavities or the like while providing adequate conformity of the copolymer adhesive layer to the pipe during application.

As noted above, in preferred forms of the present invention, the polyolefin layer provides a smooth transition between the weld bead and the adjacent circumference of the pipe. Such smooth transition preferably results from the polyolefin powder at least partially filling concave neck portions that are present at the lateral sides of the weld beads. Preferably, the powder is electrostatically charged, and this may cause the powder to deposit preferentially at sharply radiused regions of the concave neck portions. While the interface between the resulting polyolefin layer and the outer polyolefin covering in the coated pipe manufactured in accordance with the invention may, in cross-section, exhibit some degree of concavity, such concavity is desirably markedly less than the concavity exhibited at the interface between the epoxy layer and the metal of the pipe. The difference in the two concavities may be quantified in terms of the respective radii of curvature. Desirably, the radius of curvature of the interface between the polyolefin layer and the outer polyolefin covering is at least 10 times, more preferably 20 times, and still more preferably at least 50 times the radius of curvature of the concavity existing at the neck portion at the lateral sides of the weld bead.

In preferred forms of the invention, the smooth transition is achieved by application of the powder form polyolefin in thickness that is significantly greater than the combined thickness of fusion bond epoxy and copolymer adhesive that is applied, hereinafter referred to as the "underlying layer". While the thicknesses of the individual layers that are desired to be applied tend to vary according to the dimensions of the pipe, a comparison can be made between the relative thicknesses of the powder-based polyolefin coating and of the underlying layer in a given coated pipe. The thicknesses referred to are those of the layers as applied on the smoothly curved portion of the circumference of the pipe. In preferred forms of the present invention, the thickness of the powder-based polyolefin coating is approximately 0.5 times to about 5 times that of the underlying layer.

In practice, it has been found that application of the powder-based polyolefin in a thickness less than about 0.5 times that of the underlying layer may tend to result in an increased incidence of insufficient filling of the concave portions adjacent the weld neck, with the result that the above noted problems of separation of layers, formation of discontinuities, pin holes or cavities may arise. It is found that increasing the thickness of the powder-based polyolefin coating beyond about 5.0 times the thickness of the underlying layer results in little improvement in the quality of the coating layers of the product, while increasing the costs of the coating operation.

More preferably, the powder-based polyolefin coating is about 1.0 to 4.0 times thicker than the underlying layer, and still more preferably about 1.2 to about 2.0 times thicker.

In one preferred form of the present invention, steps of application of the epoxy resin, copolymer adhesive when employed, powder form polyolefin and outer polyolefin covering are conducted while the pipe is at a temperature of from about 180 to 240° C.

In some circumstances, it may be considered desirable to apply the outer polyolefin covering at a substantially lower temperature. In a further preferred form of the present invention, this can be accomplished by a procedure wherein, following the application of the powder form polyolefin, the pipe is cooled by applying cooling medium to an interior surface of the pipe until the polyolefin layer has solidified, for example as described in the Wong et al '847 patent. At that time, external cooling, for example quenching the exterior surface of the coated pipe with water may be used to further assist the cooling process.

The coated pipe is then loaded onto a coating line, and the steel or other metal of the pipe is induction heated, for example to about 90° C. The preheated pipe is then passed through an infrared heating oven wherein the polyolefin coating is heated to a temperature between 110° C. to 160° C., preferably 130° C. plus or minus 100° C. In some circumstances, it may be possible to reduce or eliminate the induction heating, and to rely on infrared heating solely.

The outer polyolefin covering may then be applied by side wrapping an extruded sheet of polyolefin onto the preheated coating to the desired thickness. Typically, the thickness of the side wrapped coating ranges from about 1 mm to 5 mm. Water quenching is applied on the outer polymer surface, typically within 2 m of the extrusion die, to solidify the polyolefin sufficiently to allow contact with handling apparatus such as conveying tires.

While in a preferred form the outer polyolefin covering is applied by a side wrapping method, it is also possible to apply the outer polyolefin covering by a cross head extrusion method. Such cross head extrusion, together with application of copolymer adhesive, is described in U.S. Pat. No. 5,026,451 (Trzecieski et al), assigned to the present applicant, the disclosures of which are incorporated herein by reference.

Side wrapping may be accomplished using the techniques well known to those skilled in the art and as generally described in U.S. Pat. No. 4,510,007 (Stucke), incorporated herein by reference.

The present invention will be more fully described, by way of example only, with reference to the accompanying drawings wherein:

FIGS. 12 and 13 shows somewhat schematically, and in the nature of a flow sheet, one preferred form of a coating method in accordance with the present invention.

Figure 1:
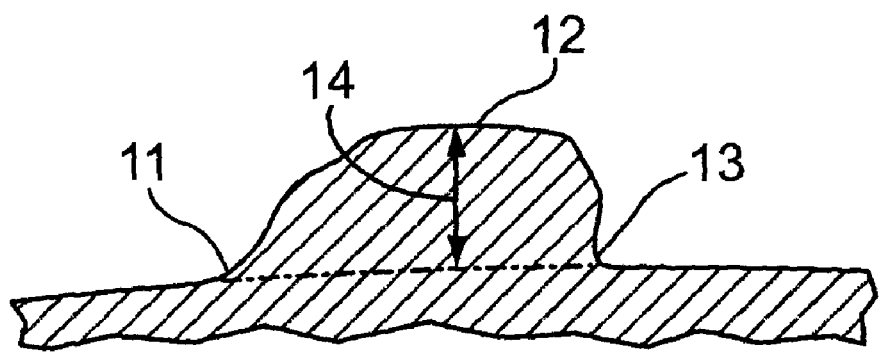
FIG. 1 shows somewhat schematically in cross-section a weld bead on the circumference of a pipe.
Figure 2:
FIGS. 2 to 6 are views similar to FIG. 1 showing various further forms of weld bead.
Figure 3:
Figure 4:
Figure 5:
Figure 6:
Figure 7:
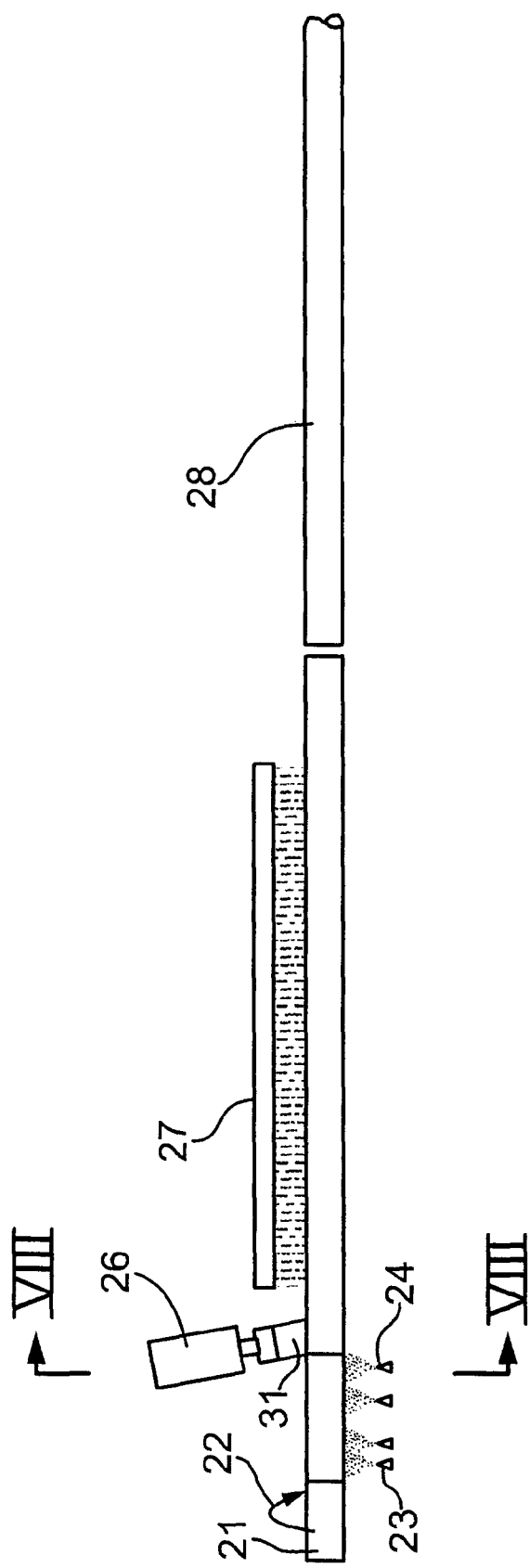
FIG. 7 shows somewhat schematically, and in the nature of a flow sheet, the procedures used in a known pipe coating procedure.

With reference to the accompanying drawings, FIG. 7 shows a conventional pipe coating method. A pipe 21 is spun around its axis as it is fed forwardly through the coating line, in a sense of rotation indicated by the arrow 22, in the conventional manner.

A. Optionally, the pipe is prepared to accept the subsequent coating, typically comprising washing, to remove loose contaminants such as mud, ice, etc., preheating to a minimum temperature of 3° C. above the dew point, and more typically to a temperature between 40 and 70° C., and abrasive blasting, to remove rust and mill scale and establish a surface profile, and B. Optional additional surface treatments such as phosphoric acid wash, chromate, etc., may be employed.

C. The pipe is preheated to a FBE (fusion bond epoxy) application temperature, typically in the range 200 to 240° C. or, in some instances, 180 to 250° C. Usually, such preheating is conducted by passing the pipe 21 through an induction heating coil or a tunnel oven.

D. The preheated pipe is conveyed through an FBE applicator device 23, wherein electrostatically charged fusion bonded epoxy powder is applied onto the hot pipe. The powder fuses and bonds to the hot pipe on contact. Typically, the thickness of the fusion bond epoxy layer that is built up on the pipe ranges from about 100 µm to 300 µm.

Examples of fusion bond epoxy powders that may be employed include the following:

Scotchkote 6233 (trade-mark) available from 3M, Morden, Manitoba Canada;

Scotchkote 626 available from 3M, Austin, Tex., U.S.A.;

Napguard 7-2514 FG, Napguard 7-2501 and Napguard 7-2500, all available from DuPont Powder Coatings, Houston, Tex., U.S.A.;

EP-2004 and EPF 1011 available from Jotun, United Arab Emirates; and

Resicoat R5-726 available from AKZO NOBEL, Germany.

E. Immediately following the FBE application, the pipe is conveyed through an adhesive powder applicator 24 which applies a copolymer adhesive powder on the hot pipe, the copolymer adhesive powder immediately fusing to the hot epoxy to form a copolymer adhesive layer on the fusion bond epoxy. The thickness of the layer that is built up typically ranges from 100 µm to 250 µm.

The copolymer adhesive that is used depends on the outer covering that is subsequently applied on the copolymer adhesive. In the case in which the outer covering is polyethylene, the following polyethylene based adhesives may for example be employed.

Fusabond EMB500DG (powder) available from Dupont, Sarnia, Ontario, Canada;

Lotader 2100 available from Arkema, France; and

Lucalen G3510H available from Basell, Germany.

In the case in which the outer covering is to be polypropylene, a polypropylene based adhesive may for example be employed, such as the following:

Fusabond PMD4310D available from DuPont, Sarnia, Ontario, Canada;

Hifax EP2015 available from Basell, Italy;

Orevac 18732P available from Arkema, France; and

Borcoat 127E available from Borealis, Finland.

F. Immediately following the adhesive application, polyolefin (for example polyethylene or polypropylene) is applied by side wrapping an extruded sheet of molten polymer in multiple overlaps from sheet extruders, schematically indicated at 26 in FIG. 7, in order to achieve the desired thickness of outer covering. Typically the thickness ranges from about 1 mm to 6 mm for stand alone anticorrosion coatings, but may be substantially thicker when the coating is a component of a thermally insulating coating system.

The extruded material 31 may, for example, comprise, in the case in which the material 31 is polyethylene:

Sclair 35BP and Sclair HEY449A, both available from Nova Chemicals, Moore, Ontario, Canada;

Lupolen 4552D available from Basell, Germany;

Innovene available from BP, Houston, Tex., United States of America.

In the case in which the extruded material 31 comprises polypropylene, the following are examples of polypropylene compositions that may be employed:

BB108E available from Borealis, Finland;

Moplen Coat EP Bianco and Profax 7823, both available from Basell, Italy; and

Hostalen PP H2483, available from Hoechst, Germany.

G. Silicone rollers, applied on the outer side of the extruded sheet, and biased toward the pipe, are used to apply pressure on the molten extruded sheet to improve contact between the polyolefin layer and the adhesive, between the polyolefin sheet overlaps, and to improve conformance of the molten polymer to surface irregularities such as raised welds.

H. Following the side wrapping, water quenching is applied on the outer polymer surface from water spraying devices 27, typically within one metre of the extrusion die, to solidify the polyolefin sufficiently to allow contact with the conveying apparatus, such as conveying tires.

I. The coated pipe 28 exits the coating line.

Figure 8:
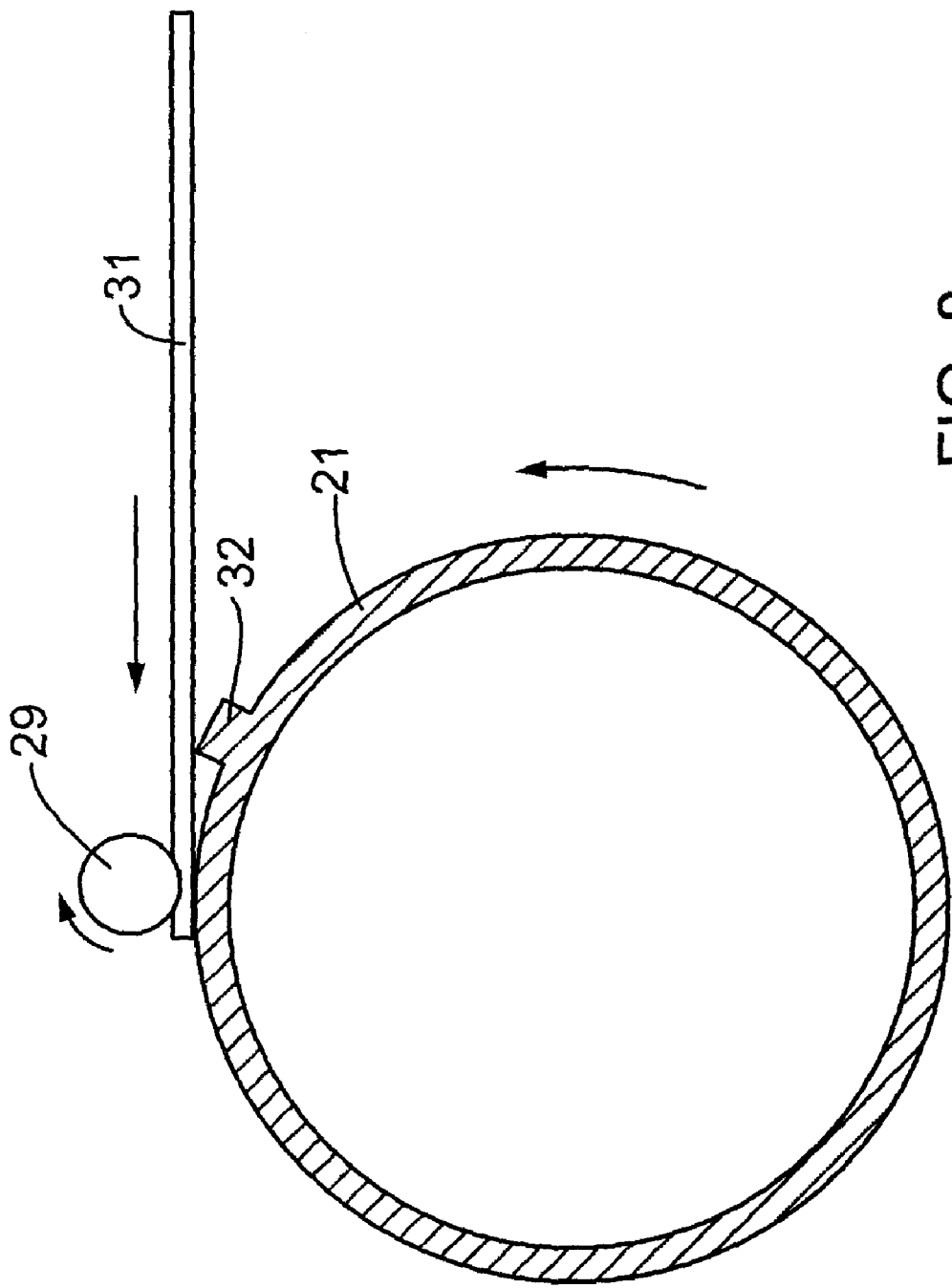
FIG. 8 shows somewhat schematically an end view, partially in cross-section, taken on the line VIII-VIII in FIG. 7, illustrating in more detail the operation at the side wrapping station in the process of FIG. 7.

FIG. 8 shows the action of a silicone roller 29 in applying pressure to the extruded sheet 31 adjacent a weld bead 32 on the pipe 21.

As can be seen, the advancing weld bead 32 impacts the lower surface of the molten sheet 31 and pushes up into it.

Figure 9:
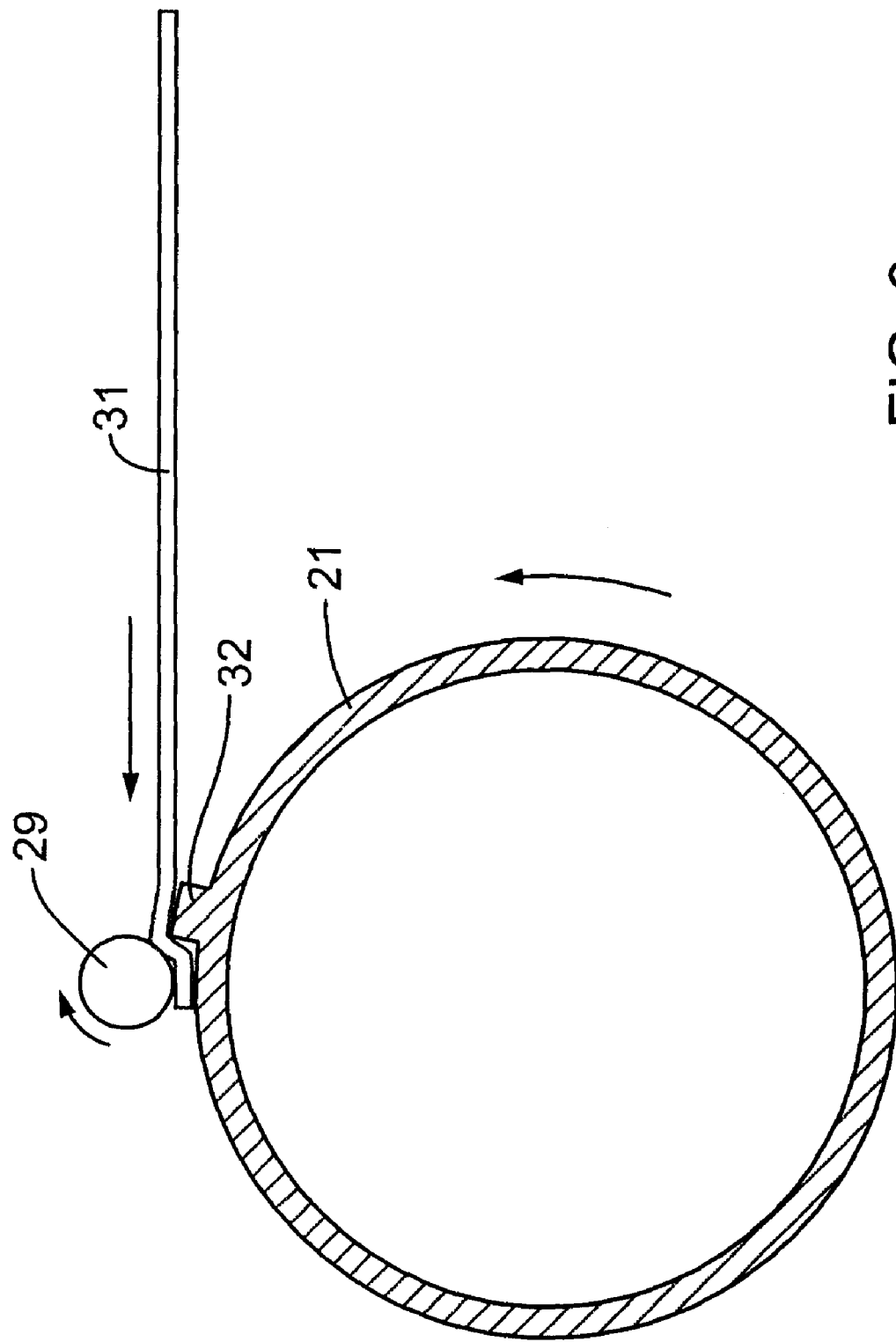
FIGS. 9 to 11 are views similar to FIG. 1, showing subsequent stages in the side wrapping procedure.

As shown in FIG. 9, the roller 29, biased toward the pipe 21 pushes the extruded material 31 toward and into the advancing weld bead 32.

Figure 10:
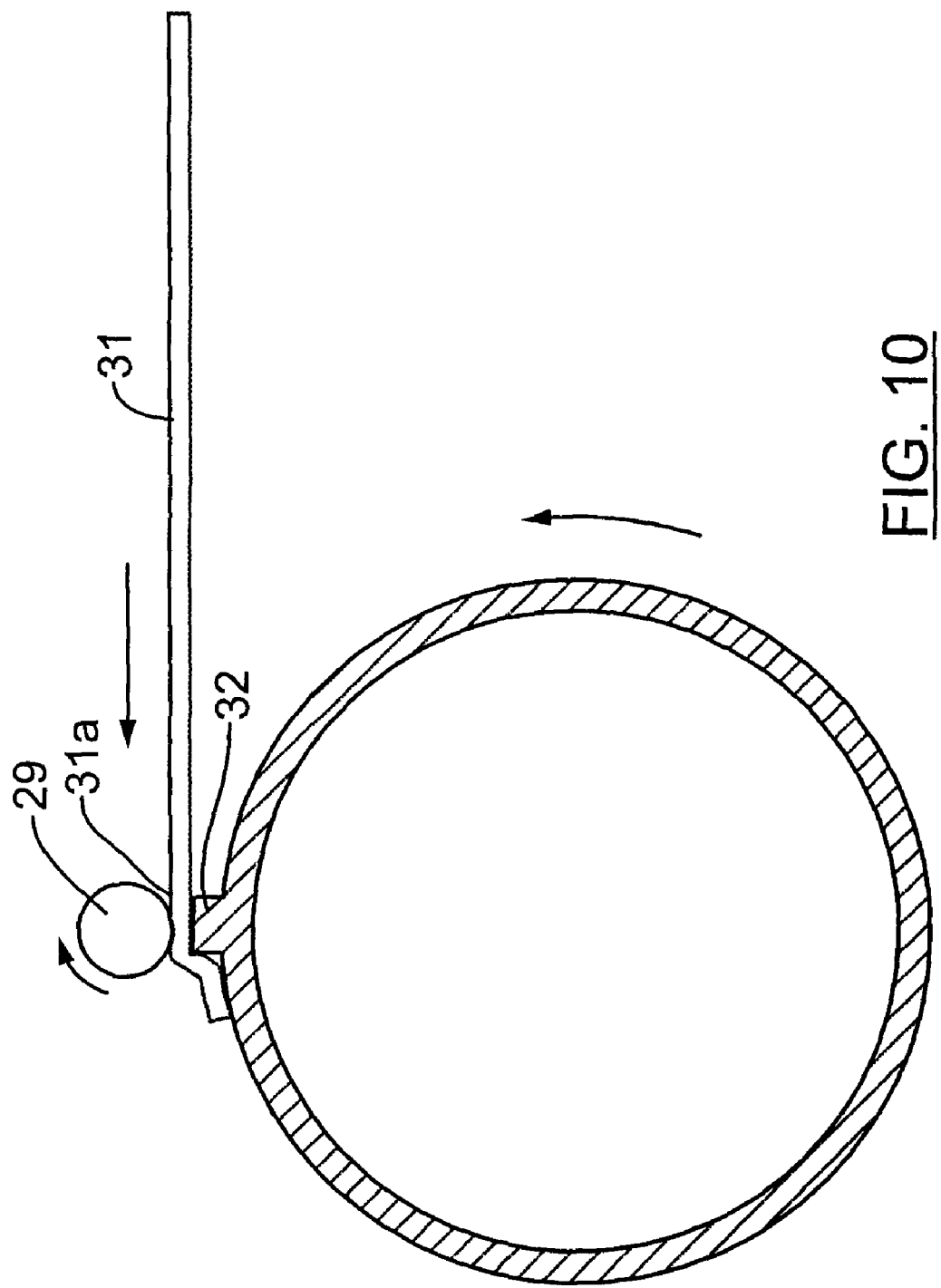

As shown in FIG. 10, at a subsequent stage, the roller 29, jumps up onto the weld bead 32, and, as a result of the reaction of the roller biasing means to the abrupt transition from the side of the weld bead to the top of the weld bead 32, tends to impact the top of the weld bead 32, tending to cause thinning of the extruded sheet 31 in the region indicated at 31a in FIG. 10.

Figure 11:
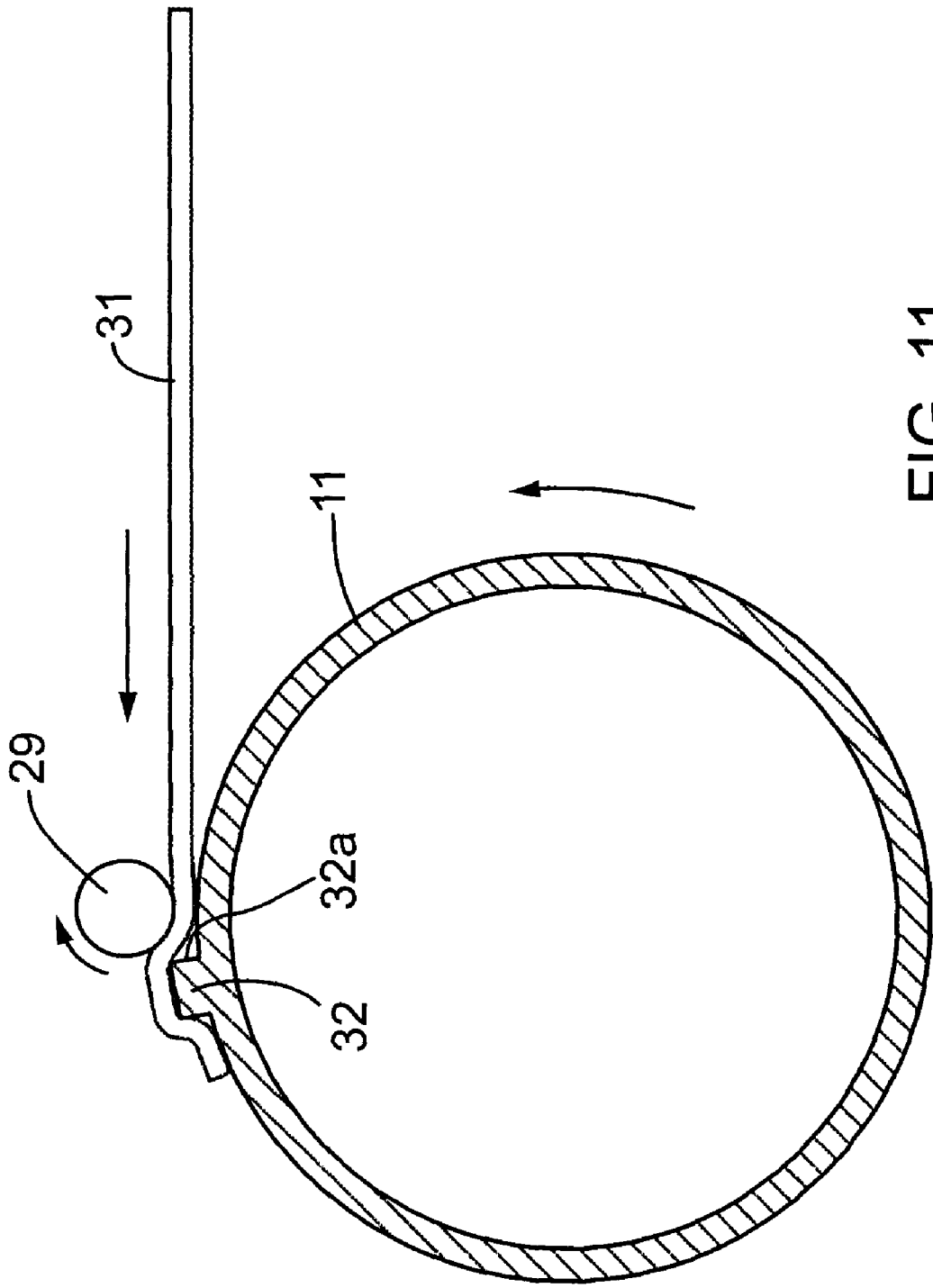

As the roller 29 passes over the weld bead and over the neck portion 32a of the weld bead 32 on the right hand side of the weld bead 32 as seen in FIG. 11, the frictional engagement of the roller 29 with the extruded sheet 31 tends to drag the extruded material 31 away from the receding weld bead 32 and the roller 29 is ineffective to form the polymer sheet into the neck portion 32a of the weld.

Further, during the cooling phase, defects tend to arise within the coating layers, to be described in more detail later, in connection with FIGS. 16 and 17.

FIGS. 12 and 13 show one example of a coating method in accordance with the present invention, conducted in two stages.

In the method illustrated, the initial steps are the same as steps A to C described above with reference to FIG. 7.

J. Electrostatic spray application of FBE is conducted from a spray applicator 33, to provide a coating of FBE of thickness typically in the range of 150 µm to 300 µm. The FBE may, for example, be any of those listed in step D above.

K. Immediately following the FBE application, an adhesive interlayer containing interspersed and interlocked domains of epoxy and copolymer is applied by mixed electrostatic spraying of FBE from applicator 34 and electrostatically charged copolymer adhesive powder from applicators 36 and 37, so that the proportions vary along the line, being higher in epoxy content at the FBE layer and higher in copolymer adhesive content at the outer portion of the layer. The typical total thickness applied from applicators 34 to 37 is about 110 to about 150 µm. The copolymer adhesive may, for example, be as described in step E above.

L. Immediately following the adhesive application, electrostatically charged polyolefin powder is applied by spraying, for example from sprays 38 to 41, or by dropping the electrostatically charged powder from vibrating pans to control the amount of powder deposited. The polyolefin powder may, for example, be as discussed in step F above.

The charged polyolefin powder fills the concave weld neck portions, and melt fuses to form a continuous polyolefin layer, typically of a thickness of approximately 350 µm to 1100 µm.

The total thickness of the layers applied on the pipe up to this stage typically range from about 750 μm to 1500 μm.

M. Once the polyolefin layer has completely fused, the pipe is internally cooled using, for example, the technique described in Wong et al '847 patent. The cooling medium, usually water, is supplied through a lance 42, inserted in the pipe 21, and providing a spray on the internal surface of the pipe at the region indicated at ID in FIG. 12. The internal cooling solidifies the polyolefin layer before it reaches the handling support such as conveyor tires.

N. Following the solidification of the polyolefin layer, external cooling from water sprays 43 is applied to further assist the cooling process.

A holiday free coating is obtained with excellent coverage adjacent the raised weld bead. The weld neck areas are filled with the polyolefin layer to form a smooth transition between the pipe body and the raised weld bead.

O. The coated pipe 44, as seen in FIG. 13 is loaded onto a coating line, and the steel temperature of the pipe is induction heated to about 90° C. In one form, the preheated pipe is passed through an infrared oven 46 where the polyolefin coating is heated to a temperature between 110° C. to 160° C., preferably 130 plus or minus 10° C. In a further form, it may be possible to reduce or eliminate the induction heating using a more highly effective infrared heating device.

P. An outer covering of polyolefin is applied by side wrapping an extruded sheet of polyolefin 48 onto the preheated coating, using an extruder 47. The thickness of the side wrapped coating typically ranges from about 1 mm to 5 mm. The polyolefin may, for example, be as discussed in step F above.

Q. Silicone rollers, for example as shown in FIGS. 8 to 11 are typically used to apply pressure on the extruded sheet 48 to improve contact between the polyolefin layer and the outer polyolefin covering and between the polyolefin over wraps, and to conform the polyolefin over wraps to surface irregularities such as raised weld beads.

R. Water quenching is applied on the outer polyolefin covering from water sprays 49, typically within one metre of the extrusion die, in order to solidify the outer polyolefin covering sufficiently to allow contact with conveying tires or like handling supports, whereafter the pipe is allowed to cool to ambient temperature. In this instance, the coating may be cooled with external cooling only, although it may also be advantageous to use the combined internal and external cooling procedure described in paragraph "M", above if the pipe temperature is very high.

The resulting coating has substantially uniform thickness around the pipe. The difference in coating thickness between the top of the weld and the body portion is minimal. The coating conforms to the weld profile, and there is no "weld tenting". It is found that this applies to both long seam and spiral welded pipes.

Figure 14:
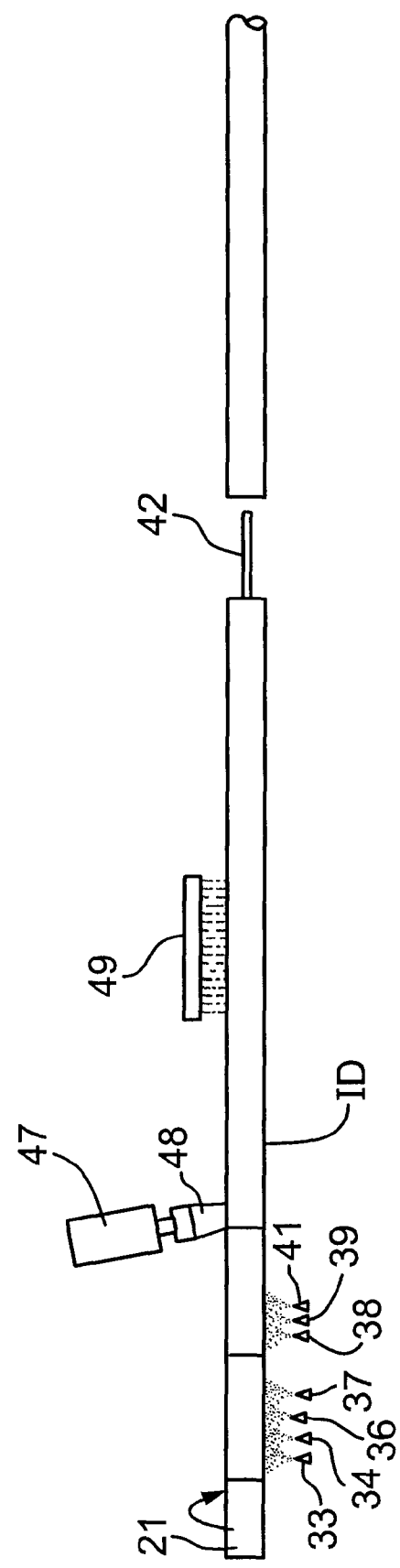
FIG. 14 is a view similar to FIGS. 12 and 13, showing a further preferred form of a coating method of the present invention.

FIG. 14 shows one example of a further form of coating method in accordance with the present invention, conducted in a single stage.

In the method illustrated in FIG. 14, the initial steps are the same as steps A to C described above with reference to FIG. 7, and steps J and L described above with reference to FIG. 12.

S. When the polyolefin powder, for example as applied from sprays 38, 39 and 41 begins to melt fuse, a layer of polyolefin 48 is applied on top of the coating by side wrapping a sheet extruded from extruder 47, of molten polymer, to the desired thickness. The typical thickness of the outer polyolefin covering ranges from about 1 mm to about 5 mm. The polyolefin may, for example, be as discussed in step F above.

T. As before, silicone rollers may be applied to apply pressure to the extruded sheet to improve contact between the outer polyolefin covering and the powder-based polyolefin coating, between the polyolefin outer covering overlaps, and to conform the outer polyolefin covering to surface irregularities such as raised welds.

U. The pipe is internally cooled at the region indicated ID in FIG. 14 using cooling medium supplied from a lance 42, as described above. The internal cooling is applied such that the outer polyolefin covering has solidified before it reaches the conveyor tires or like support apparatus. At that time, external cooling from water sprays 49 may be used to assist the cooling process.

With the methods described in connection with FIGS. 12 and 13, as well as FIG. 14, the combination of epoxy reinforcing of the copolymer adhesive, imparting a much higher melt strength, the filling of concave neck portions with powder polyolefin, and the provision of a smooth transition around the weld neck portions, as well as the effects of internal surface cooling, serving to consolidate the materials around the pipe surface, contribute to achieving superior qualities of the coating and a uniform coating thickness around the entire pipe, including the weld bead portion. The difference in thickness between the top of the weld bead and the body of the pipe is minimal. The coating conforms to the weld bead profile, and there is no "weld tenting". This applies to both long seam and spiral welded pipes.

COMPARATIVE EXAMPLE 1

A pipe coating method was conducted as described with reference to FIGS. 7 to 11.

The conditions are as indicated in Table 1 below.

TABLE 1

| Step | Condition | Value |
| --- | --- | --- |
| C | Pipe preheating temp. | 232° C. |
| D | FBE thickness | 200 μm |
| F | Adhesive thickness | 125 μm |
| F | Outer covering thickness | 3.5 mm |

Figure 15:
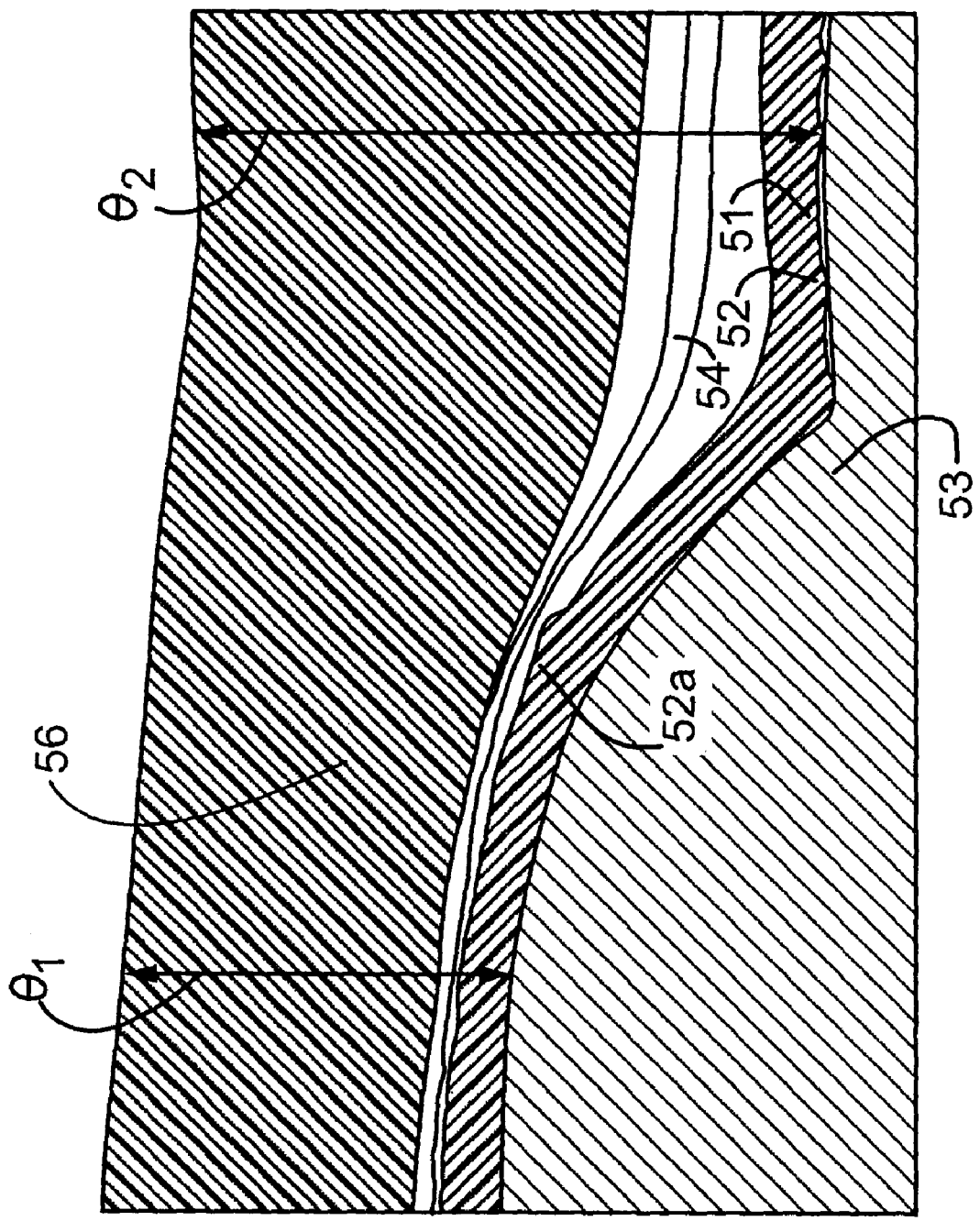
FIGS. 15 and 16 show photo micrographic cross-sections taken in the region of the neck portions of a weld bead, illustrating defects that may arise in coating obtained with known methods.
Figure 16:
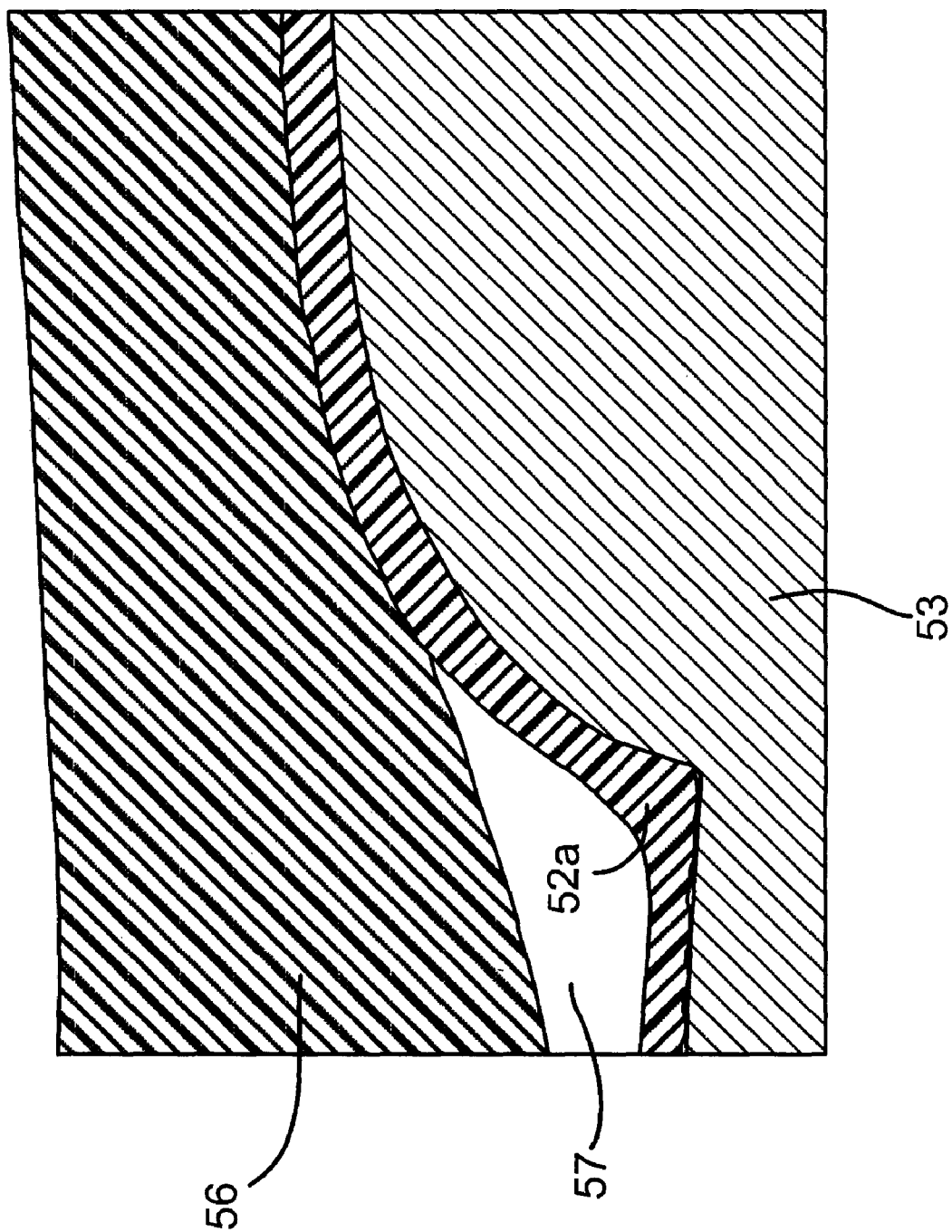

FIGS. 15 and 16 show a photomicrographic cross-sections through a coating achieved with the process described in comparative Example 1.

In FIG. 15, it will be seen that there is a large discrepancy in the thickness $\theta_1$ over the weld bead as compared with the thickness $\theta_2$ over the body of the pipe, and there is disbandment at region 51 between the FBE layer 52 and the steel 53.

At region 54, there is separation of the layers at or close to the interface between the adhesive 52a and the outer polyolefin covering 56.

In FIG. 16, at region 57, there is a large gap or opening between the layers, apparently between the copolymer adhesive layer 52a and the polyethylene 56.

EXAMPLE 1

A coating method was conducted following the procedure described above in detail with reference to FIGS. 12 and 13.

The conditions indicated in Table 2 below were employed.

TABLE 2

| Step | Condition | Value |
| --- | --- | --- |
| J | FBE thickness | 200 μm |
| K | Adhesive interlayer thickness | 125 μm |

Figure 17:
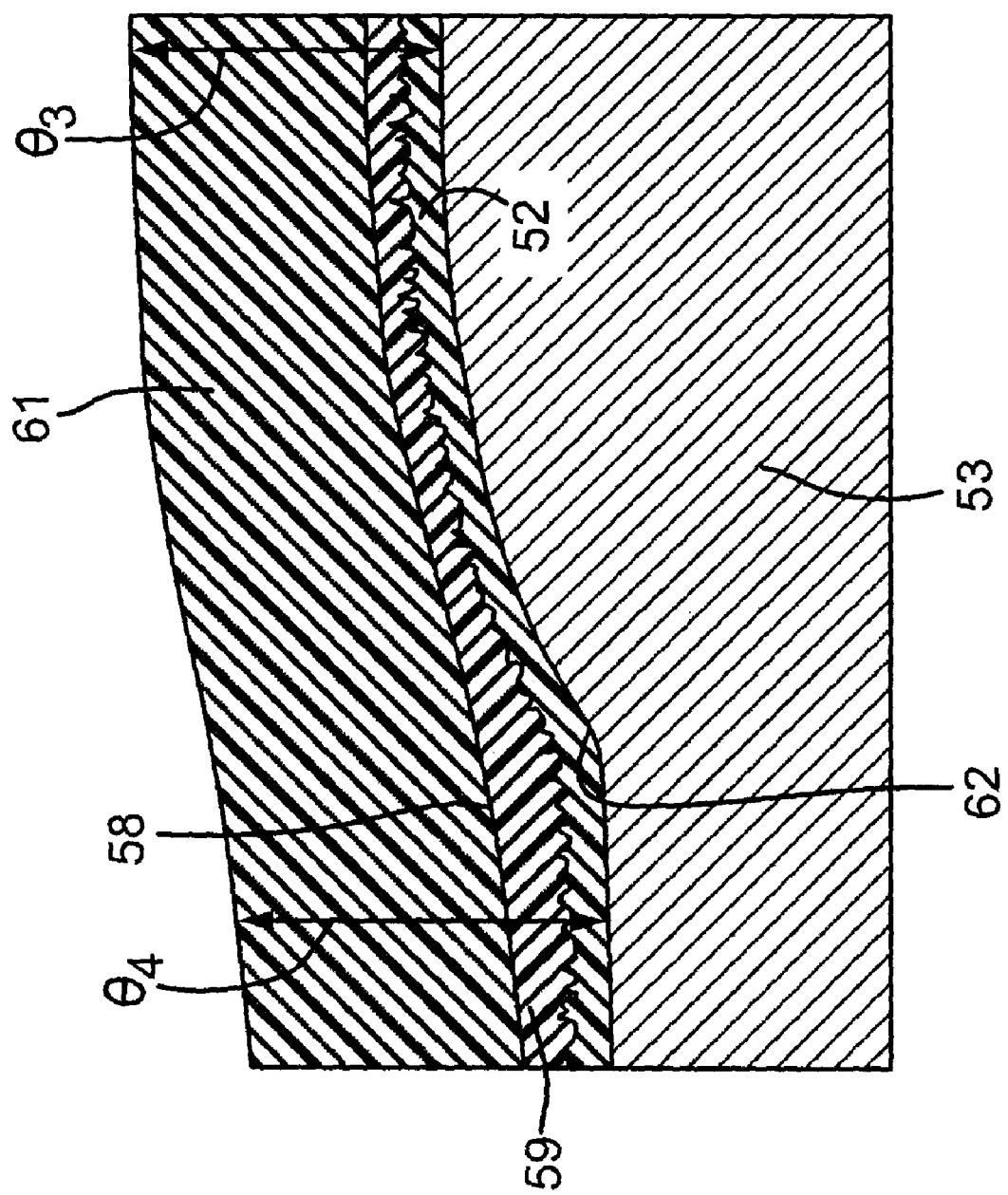
FIG. 17 is a photo micrographic cross-section taken in the region of the neck portion of a weld bead, showing the integrity of the coating produced in accordance with a method in accordance with the invention.

FIG. 17 is a photomicrographic cross-section through the coating that is achieved.

There is minimal difference in the thicknesses $\theta_3$ and $\theta_4$ of the coating over the top of the weld bead and over the body of the pipe, respectively. There is no disbandment of the FBE 52 from the steel 53, and there is no separation of any layer from an adjacent layer or any discontinuity whatsoever in the coating.

It will be noted that the interface 58 between the polyolefin layer 59 and the outer polyolefin covering 61 provides a substantially smooth transition between the body of the pipe and the top of the weld bead. The radius of curvature of this interface is very large, and is greatly in excess of the radius of curvature at the sharply arcuately concave neck portion 62 between the weld bead and the surface of the body of the pipe.

EXAMPLE 3 is A coating method was carried out in accordance with the procedure described in more detail above with reference to FIG. 14 of the drawings.

Photomicrographic examination of a cross-section adjacent the neck portions of the weld bead showed an excellent quality pipe coating, similar to that shown in FIG. 17.

The invention claimed is:

1. A method of coating pipe having a raised weld bead on an outer circumference thereof, said weld bead projecting from the outer circumference of the pipe; said method comprising the steps of:
   applying a curable resin polymer to said pipe and permitting said curable resin polymer to bond to the pipe to form a cured or partially cured polymer layer thereon;
   while the pipe is hot, applying powder form adhesive composition on said pipe having the cured or partially cured polymer layer thereon under conditions permitting fusion of the adhesive composition into a continuous film and bonding to the cured or partially cured polymer layer;
   while the pipe is hot, applying powder form polyolefin on said pipe having the adhesive composition layer thereon under conditions permitting fusion of the polyolefin powder into a continuous film and bonding to the adhesive composition layer to form a powder-based polyolefin coating on the pipe;
   at a stage following formation of said powder-based polyolefin coating, cooling the pipe from a side distal to said powder-based polyolefin coating;
   applying on said pipe having said powder-based polyolefin coating thereon an outer polyolefin covering bondable to said powder-based polyolefin coating, and allowing bonding of said polyolefin covering to said powder-based polyolefin coating;
   allowing cooling of the pipe to ambient temperature.

2. A method according to claim 1 wherein, following cooling of the pipe from the side distal to said powder-based polyolefin coating, external cooling is applied after a coating immediately adjacent to the pipe has been substantially cooled.

3. A method according to claim 1 including heating the pipe after said cooling step and before applying said outer polyolefin covering.

4. A method according to claim 1 including cooling by applying cooling medium on an outer surface after applying said outer polyolefin covering.

5. A method according to claim 1 in which the adhesive composition is a mixture of the curable resin polymer and a polyolefin copolymer adhesive.

6. A method according to claim 1 in which the adhesive composition comprises a polyolefin copolymer.

7. A method according to claim 1 in which the curable resin polymer is an epoxy composition.

8. A method according to claim 1 wherein said powder form polyolefin is electrostatically charged.

9. A method according to claim 1 wherein the ratio of the thickness of the powder-based polyolefin coating to the combined thickness of the epoxy layer and the adhesive composition layer is 0.5:1 to 5:1.

10. A method according to claim 9 wherein said ratio is 1:1 to 4:1.

11. A method according to claim 10 wherein said ratio is 1.2:1 to 2:1.

12. A method of coating pipe having a raised weld bead on an outer circumference thereof, said weld bead projecting from the outer circumference of the pipe; said method comprising the steps of:
   applying a curable resin polymer to said pipe and permitting said curable resin polymer to bond to the pipe to form a cured or partially cured polymer layer thereon;
   while the pipe is hot, applying powder form adhesive composition on said pipe having the cured or partially cured polymer layer thereon under conditions permitting fusion of the adhesive composition into a continuous film and bonding to the cured or partially cured polymer layer;
   while the pipe is hot, applying powder form polyolefin on said pipe having the adhesive composition layer thereon under conditions permitting fusion of the polyolefin powder into a continuous film and bonding to the adhesive composition layer to form a powder-based polyolefin coating on the pipe;
   applying on said pipe having said powder-based polyolefin coating thereon an outer polyolefin covering bondable to said powder-based polyolefin coating, and allowing bonding of said polyolefin covering to said powder-based polyolefin coating;
   cooling the pipe from a side distal to said powder-based polyolefin coating or by a combination in which the initial cooling is done from the side distal to said powder-based polyolefin coating, and the external cooling follows only after the coating immediately adjacent to the pipe has been substantially cooled.

13. A method according to claim 12 wherein, following cooling of the pipe from the side distal to said powder-based polyolefin coating, external cooling is applied after a coating immediately adjacent to the pipe has been substantially cooled.

14. A method according to claim 12 in which the adhesive composition is a mixture of the curable resin polymer and a polyolefin copolymer adhesive.

15. A method according to claim 12 in which the adhesive composition comprises a polyolefin copolymer.

16. A method according to claim 12 in which the curable resin polymer is an epoxy composition.

17. A method according to claim 12 wherein said powder form polyolefin is electrostatically charged.

18. A method according to claim 12 wherein the ratio of the thickness of the powder-based polyolefin layer to the combined thickness of the epoxy layer and the adhesive composition layer is 0.5:1 to 5:1.

19. A method according to claim 18 wherein said ratio is 1:1 to 4:1.

20. A method according to claim 19 wherein said ratio is 1.2:1 to 2:1.

* * * * *

UNITED STATES PATENT AND TRADEMARK OFFICE
CERTIFICATE OF CORRECTION

| | | |
|---|---|---|
| PATENT NO. | : 8,038,829 B2 | Page 1 of 1 |
| APPLICATION NO. | : 12/278317 | |
| DATED | : October 18, 2011 | |
| INVENTOR(S) | : Steele et al. | |

It is certified that error appears in the above-identified patent and that said Letters Patent is hereby corrected as shown below:

Column 5, Line 65, delete "100°C" and substitute therefore -- 10° C --.

Column 10, Line 44, delete "disbandment" and substitute therefore -- disbondment --.

Column 11, Line 1, delete "disbandment" and substitute therefore -- disbondment --.

Column 11, Line 15, delete "is".

Signed and Sealed this
Twenty-seventh Day of March, 2012

David J. Kappos
*Director of the United States Patent and Trademark Office*